(12) United States Patent
Hashimoto et al.

(10) Patent No.: US 8,638,003 B2
(45) Date of Patent: Jan. 28, 2014

(54) INVERTER GENERATOR

(75) Inventors: Shoji Hashimoto, Wako (JP); Maodao Fu, Wako (JP); Kazufumi Muronoi, Wako (JP)

(73) Assignee: Honda Motor Co. Ltd., Tokyo (JP)

( * ) Notice: Subject to any disclaimer, the term of this patent is extended or adjusted under 35 U.S.C. 154(b) by 65 days.

(21) Appl. No.: 13/472,564

(22) Filed: May 16, 2012

(65) Prior Publication Data

US 2012/0294050 A1 Nov. 22, 2012

(30) Foreign Application Priority Data

| May 17, 2011 | (JP) | 2011-110572 |
| May 17, 2011 | (JP) | 2011-110573 |
| May 17, 2011 | (JP) | 2011-110574 |

(51) Int. Cl.

| B60L 11/02 | (2006.01) |
| B61C 9/38 | (2006.01) |
| F02N 11/04 | (2006.01) |
| H02M 7/48 | (2007.01) |
| H02M 5/45 | (2006.01) |
| H02J 1/10 | (2006.01) |

(52) U.S. Cl.
USPC ............. 290/27; 363/71; 363/65; 363/37

(58) Field of Classification Search
USPC .................. 290/27; 363/37, 65, 71
See application file for complete search history.

(56) References Cited

U.S. PATENT DOCUMENTS

| 4,975,822 | A | * | 12/1990 | Lipman | 363/40 |
| 5,406,470 | A | * | 4/1995 | Ridley et al. | 363/69 |
| 5,625,545 | A | * | 4/1997 | Hammond | 363/71 |
| 5,638,263 | A | * | 6/1997 | Opal et al. | 363/65 |
| 5,852,554 | A | * | 12/1998 | Yamamoto | 363/71 |
| 5,999,428 | A | * | 12/1999 | Dahler et al. | 363/71 |
| 6,014,323 | A | * | 1/2000 | Aiello et al. | 363/71 |
| 6,229,722 | B1 | * | 5/2001 | Ichikawa et al. | 363/71 |
| 6,236,580 | B1 | * | 5/2001 | Aiello et al. | 363/37 |
| 6,256,213 | B1 | * | 7/2001 | Illingworth | 363/89 |
| 6,262,555 | B1 | * | 7/2001 | Hammond et al. | 318/759 |
| 6,320,767 | B1 | * | 11/2001 | Shimoura et al. | 363/37 |
| 6,377,478 | B1 | * | 4/2002 | Morishita | 363/34 |
| 6,621,719 | B2 | * | 9/2003 | Steimer et al. | 363/43 |
| 6,954,366 | B2 | * | 10/2005 | Lai et al. | 363/71 |
| 7,068,524 | B2 | * | 6/2006 | Nakagawa et al. | 363/67 |
| 7,511,975 | B2 | * | 3/2009 | Hammond | 363/49 |
| 7,830,681 | B2 | * | 11/2010 | Abolhassani et al. | 363/37 |

(Continued)

FOREIGN PATENT DOCUMENTS

JP 2010-206904 9/2010

*Primary Examiner* — Pedro J Cuevas

(74) *Attorney, Agent, or Firm* — Rankin, Hill & Clark LLP

(57) ABSTRACT

In an inverter generator having a first, second and third inverters, a first, second and third controllers adapted to control turning ON/OFF of switching elements thereof and to operate the first inverter as a master inverter and the second and third inverters as slave inverters, a three-phase output terminal, a single-phase output terminal, and an engine control section adapted to send an output of a selector switch to the first controller and so on, thereby outputting three-phase or single-phase AC through control of turning ON/OFF of the switching elements, so that the outputs from the first, second and third inverters become in the three-phase or single-phase AC in response to the output of the selector switch making the output from the first inverter as a reference.

15 Claims, 14 Drawing Sheets

(56) References Cited

U.S. PATENT DOCUMENTS

| | | |
|---|---|---|
| 7,880,343 B2 * | 2/2011 | Kleinecke et al. ............ 307/412 |
| 7,940,537 B2 * | 5/2011 | Abolhassani et al. .......... 363/65 |
| 8,045,346 B2 * | 10/2011 | Abolhassani et al. .......... 363/37 |
| 8,130,501 B2 * | 3/2012 | Ledezma et al. .............. 361/727 |
| 8,223,515 B2 * | 7/2012 | Abolhassani et al. .......... 363/65 |
| 8,254,076 B2 * | 8/2012 | Ledezma et al. .............. 361/118 |
| 8,279,640 B2 * | 10/2012 | Abolhassani et al. .......... 363/37 |
| 2005/0264266 A1 * | 12/2005 | Nakagawa et al. ............. 322/25 |
| 2012/0291739 A1 * | 11/2012 | Hashimoto et al. ........ 123/179.3 |
| 2012/0293004 A1 * | 11/2012 | Hashimoto et al. ............. 307/82 |
| 2012/0293140 A1 * | 11/2012 | Hashimoto ..................... 322/94 |
| 2012/0294049 A1 * | 11/2012 | Hashimoto et al. ............. 363/37 |

\* cited by examiner

GENERATING SQUARE WAVE SHIFTED BY 120 AND 240 DEGREE

WHEN LOWERING FREQUENCY OF REFERENCE WAVE

ALWAYS GENERATING SYNCHRONIZED SIGNAL CORRESPONDING TO INCREASING AND DECREASING FREQUENCY OF REFERENCE SIGNAL

INVERTER GENERATOR

BACKGROUND OF THE INVENTION

1. Technical Field

Embodiments of this invention relate to an inverter generator, particularly to an inverter generator adapted to output three-phase alternating current and single-phase alternating current selectively.

2. Background Art

It is a well-known technique for an inverter generator adapted to output three-phase AC and single-phase AC selectively, as taught, for example, by Japanese Laid-Open Patent Application No. 2010-206904. The inverter generator disclosed in the reference is configured to have three sets (three) of single-phase inverter generators connected in parallel and to output three-phase AC and single-phase AC selectively.

SUMMARY

In the aforementioned inverter generator according to '904, a single inverter control circuit operates inverter drive circuits of the three sets of single-phase inverter generators to output three-phase AC and single-phase AC selectively.

In this kind of generators, it is required to synchronize outputs from three sets of inverter generators such that they generate outputs of a same voltage in a same phase for a single-phase mode or of a same voltage in different phases each offset by 120 degrees from others for a three-phase mode. However, it is difficult to synchronize the outputs from three sets of inverter generators. Nevertheless, since the generator according to '904 does not explicitly teach how to synchronize the outputs, it is difficult from the teaching to reliably output a three-phase AC and single-phase AC at a desired voltage in a desired phase, thereby unable to utilize the output from the generator sufficiently.

An object of the embodiments of this invention is therefore to overcome the aforementioned problem by providing an inverter generator that can output three-phase AC and single-phase AC of a desired voltage in a desired phase selectively and reliably, thereby enabling to utilize the output from the generator sufficiently.

In order to achieve the object, the embodiments provide in its first aspect an inverter generator, having an inverter that inverts AC output from first, second and third windings wound around an alternator driven by an engine, comprising: first, second and third inverters each connected to the first, second and third windings respectively and each having switching elements for direct current and alternating current conversion, the first, second and third inverters inverting alternating current outputted from the first, second and third windings into direct current when the switching element for direct current conversion is turned ON/OFF, while converting the converted direct current into alternating current in a desired frequency when the switching element for alternating current conversion is turned ON/OFF based on a PWM signal generated in accordance with a reference sine wave of a desired output voltage waveform and a carrier; first, second and third controllers adapted to control turning ON and OFF of the switching elements of the first, second and third inverters and connected to communicate with each other, the first controller operating the first inverter as a master inverter and the second and third controller operating the second and third inverters as slave inverters; a three-phase output terminal connected to terminal groups which are connected to the first, second and third inverters to output the inverted alternating current as one of U-phase, V-phase, and W-phase outputs and connected to a neutral terminal of the terminal groups in series; a single-phase output terminal connected to the terminal groups in parallel and connected to the neutral terminal in series; a switching mechanism adapted to switch the three-phase output terminal and single-phase output terminal; three-phase/single-phase selector switch adapted to be manipulated by a user; and an engine controller adapted to control an operation of the engine and operate the switching mechanism to output a three-phase alternating current or single-phase alternating current in response to output of the selector switch; wherein the first, second and third controllers control turning ON and OFF of the switching elements so that the outputs from the first, second and third inverters become three-phase alternating current or single-phase alternating current making the output from the first inverter as a reference in response to the output of the selector switch sent through the engine controller.

BRIEF DESCRIPTION OF DRAWINGS

The above and other objects and advantages will be more apparent from the following description and drawings in which:

FIG. 16 is an explanatory view showing characteristics of generated voltage against frequency of the inverter generator shown in FIG. 15 or so on.

DESCRIPTION OF EMBODIMENTS

An inverter generator according to embodiments of the present invention will now be explained with reference to the attached drawings.

Figure 1:
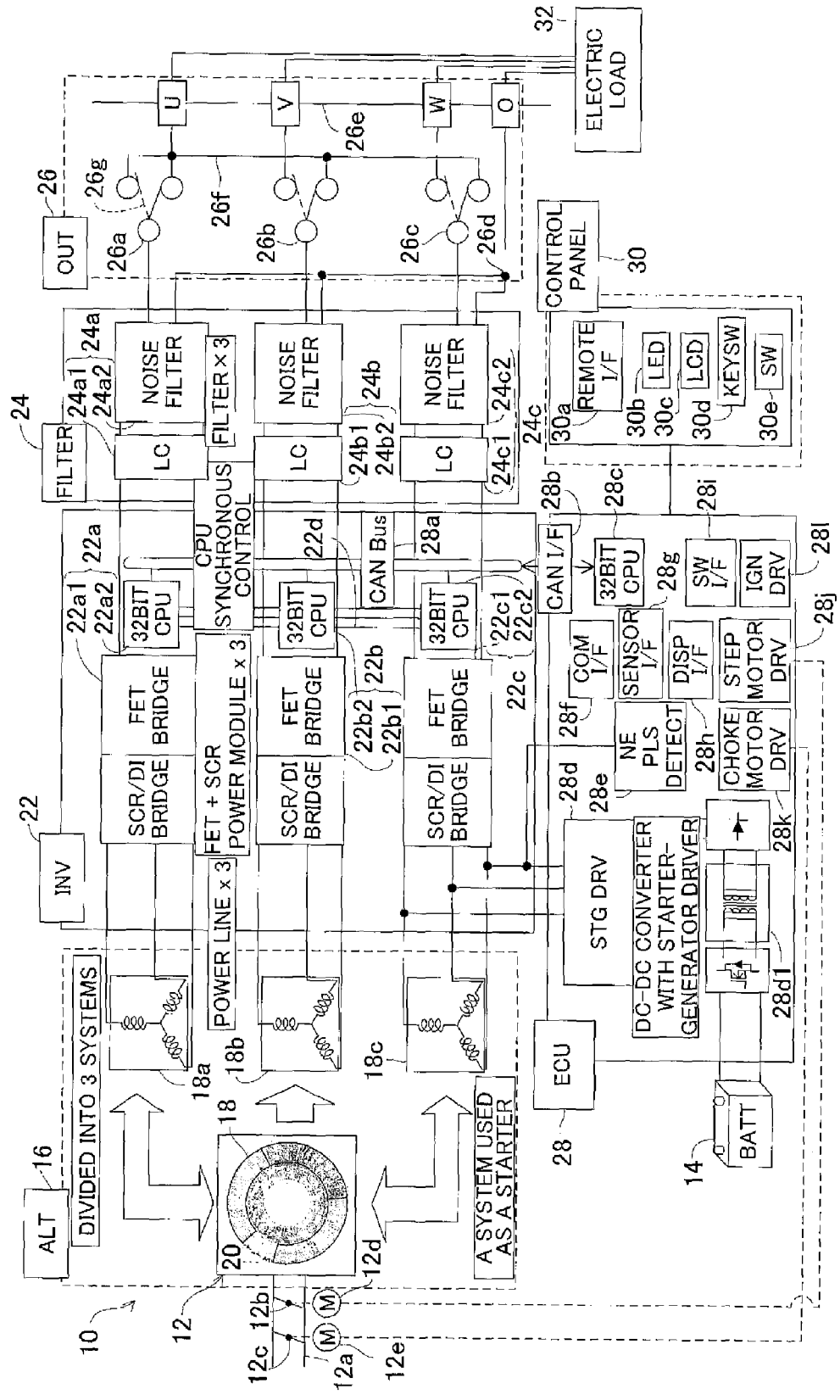
FIG. 1 is an overall block diagram showing an inverter generator according to a first embodiment of the invention.

FIG. 1 is an overall block diagram showing an inverter generator according to a first embodiment of the invention.

In FIG. 1, symbol 10 designates an inverter generator. The generator 10 is equipped with an engine (internal combustion engine) 12 and has a rated output of about 5 kW (AC (alternating current) 100V, 50 A). The engine 12 is an air-cooled, spark-ignition gasoline engine.

A throttle valve 12b and choke valve 12c are installed in an air intake pipe 12a of the engine 12. The throttle valve 12b is connected to a throttle motor (composed of a stepper motor) 12d, and the choke valve 12c is connected to a choke motor (also composed of a stepper motor) 12e.

The engine 12 is equipped with a battery 14 whose rated output is about 12V. When power is supplied from the battery 14, the throttle motor 12d and choke motor 12e respectively drive the throttle valve 12b and choke valve 12c to open and close. The engine 12 has an alternator section (shown as "ALT") 16.

Figure 2:
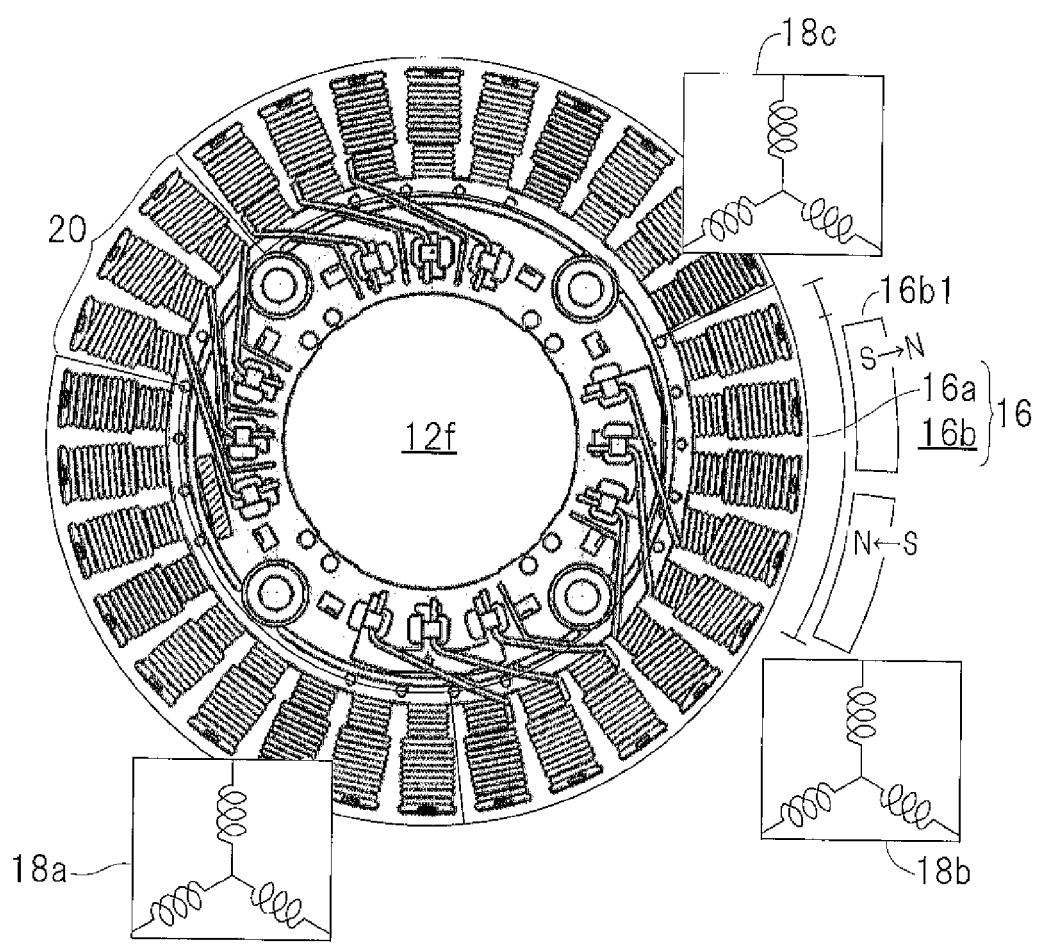
FIG. 2 is a plan view showing a crank case of an engine of the inverter generator shown in FIG. 1.

FIG. 2 is a plan view of a crank case 12f of the engine 12 shown in FIG. 1, where the alternator section 16 is provided.

As shown in FIG. 2, the alternator section 16 includes a stator 16a mounted on the crank case 12f of the engine 12, and a rotor 16b which is rotatably installed around the stator 16a and also functions as a flywheel of the engine 12.

The stator 16a comprises thirty teeth. Twenty-seven teeth of them are wound by three-phase output windings (main windings) 18 comprising of three sets of U, V and W-phase windings, and the other three teeth of them are also wound by one three-phase output winding (sub winding) 20 comprising one set of the U, V, and W-phase windings. The main windings 18 comprise windings 18a, 18b and 18c.

Multiple pairs of permanent magnet pieces 16b1 are embedded or attached inside the rotor 16b installed on the outer side of the stator 16a with radially oriented polarity reversed alternately to face the output windings 18, 20. In the alternator section 16, when the permanent magnet pieces 16b1 of the rotor 16b are rotated around the stator 16a, AC power of the U, V, and W-phase is outputted (generated) from the three-phase output windings 18 (more specifically, 18a, 18b, 18c) and the AC power of each phase is also outputted from the sub winding 20.

The explanation of FIG. 1 will be resumed. The generator 10 according to this embodiment has, in addition to the alternator section (ALT) 16 where the output windings 18 are wound, an inverter section (shown as "INV") 22, a filter section (shown as "FILTER") 24, an output section (shown as "OUT") 26, an engine control section (shown as "ECU") 28, and an engine control panel section (shown as "CONTROL PANEL") 30. The ECU (Electronic Control Unit) functions as an electronic control section and has a CPU as explained later.

As illustrated, the characteristic feature of the generator 10 according to this embodiment is that three sets (three) of single-phase inverter generators (inverters) are connected in parallel so that they can output a three-phase AC of a desired voltage in a desired phase or a single-phase AC of a desired voltage selectively and reliably.

Specifically, the generator 10 has three sets of windings 18 composed of first, second and third windings 18a, 18b, 18c, the inverter section 22 comprising three sets of the inverters composed of first, second and third inverters (inverter generators) 22a, 22b, 22c, the filter section 24 comprising three sets of filters composed of first, second and third filters 24a, 24b, 24c, the output section 26 comprising a three-phase output terminal 26e and a single-phase output terminal 26f, the engine control section 28 that controls an operation of the engine 12, and the control panel section 30.

The inverter section 22 and other sections are provided with, for example, semiconductor chips installed on a printed circuit board accommodated in a case located at an appropriate position of the engine 12. The control panel section 30 is also provided with semiconductor chips similarly installed at an appropriate position of the engine 12 and a panel connected thereto.

The output windings 18, the inverter section 22, the filter section 24 and the output section 26 (each comprising three sets labeled with letters a, b or c) are configured to be connected with the part of the same letter to each other correspondently.

Each of the first, second and third inverters 22a, 22b, 22c constituting the inverter section 22 comprises a single-phase two-wire inverter that has power modules 22a1, 22b1, 22c1 composed of FETs (Field Effect Transistors) and SCRs (thyristors) integrally connected thereto, 32-bit CPUs 22a2 (first controller), 22b2 (second controller), 22c2 (third controller), and various sensors including a voltage/current sensor (not shown) for detecting a voltage and current of a power output. The CPUs 22a2, 22b2, 22c2 are connected via a communication path 22d with each other to be enabled to communicate therewith.

Figure 3:
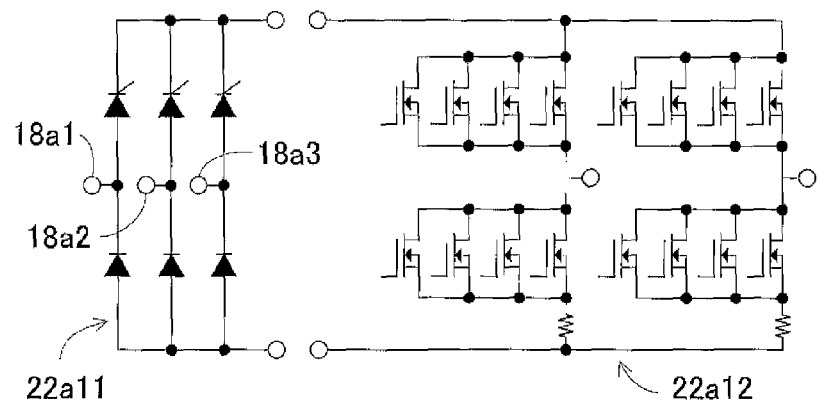
FIG. 3 is a circuit diagram showing a detailed configuration of an inverter section of the inverter generator shown in FIG. 1.

FIG. 3 is a circuit diagram showing a configuration of the inverter section 22 in detail. Although the following explanation will be made for the set a, the explanation can also be applied to the sets b and c, since their configurations are basically the same with each other.

As illustrated in FIG. 3, the power module 22a1 comprises a hybrid bridge circuit 22a11 in which three SCRs (thyristors used as switching elements for direct current (DC) conversion) and three DIs (diodes) are bridge-connected, and an H bridge circuit 22a12 in which four FETs (Field Effect Transistors used as switching elements for AC conversion) are bridge-connected.

Three-phase AC power outputted (generated) from the U-phase winding 18a of the output windings 18 wound around the alternator section 16 is inputted to the first inverter 22a associated therewith and then inputted to a mid-point between the SCR and DI in the hybrid bridge circuit 22a11 of the power module 22a1.

A gate of the SCR in the hybrid bridge circuit 22a11 is connected to the battery 14 via a driver circuit (not shown). The CPU 22a2 controls current supply (ON; conducted) or termination of the current supply (OFF; not conducted) to the gate of the SCR from the battery 14 through the driver circuit.

Specifically, based on the output of sensors, such as the voltage/current sensor 22a3, the CPU 22a2 turns ON (conducts) the gate of the SCR at a turn-on angle (angle of conduction) corresponding to a desired output voltage, such that the AC inputted to the power module 22a1 from the output winding 18a is converted into DC at the desired output voltage.

The DC outputted from the hybrid bridge circuit 22a11 is inputted to the FETs-H bridged circuit 22a12 where the FETs are connected to the battery 14. The CPU 22a2 controls current supply (ON; conducted) to the FETs or termination of current supply (OFF; not conducted), the inputted DC is inverted into AC in a desired frequency (e.g., a commercial frequency of 50 Hz or 60 Hz).

Figure 4:
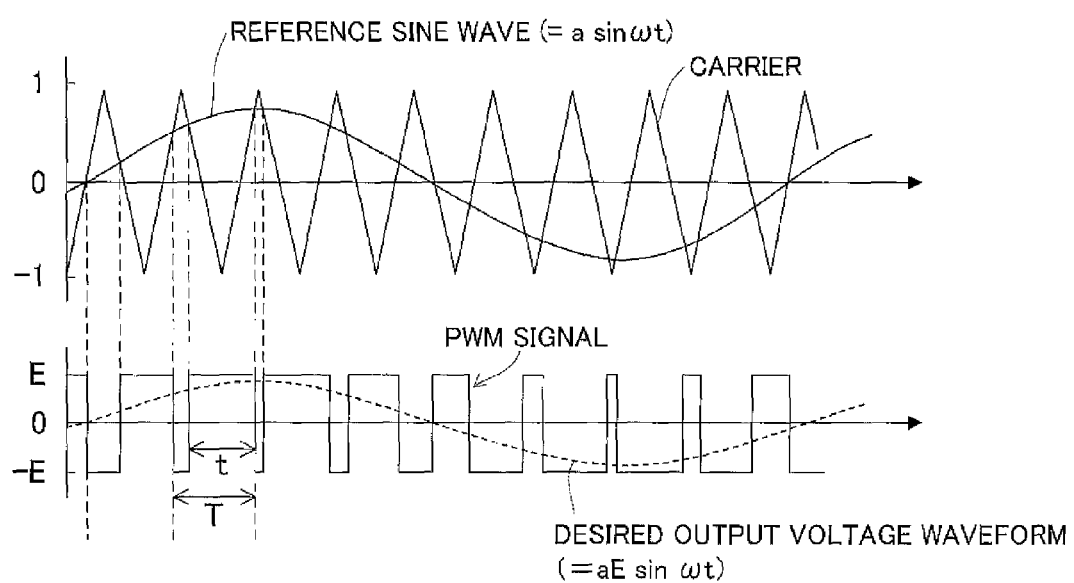
FIG. 4 is an explanatory view explaining an operation of the inverter section of the inverter generator shown in FIG. 1.

FIG. 4 is an explanatory view explaining an operation of the H bridge circuit 22a12.

As illustrated, the CPU 22a2 generates a reference sine wave (signal wave; shown by an upper solid-line wave) in a predetermined frequency (i.e., 50 Hz or 60 Hz commercial frequency) of the desired output voltage (in waveform), and compares the generated reference sine wave with a carrier (e.g., a 20 kHz carrier wave) using a comparator (not shown) so as to produce a PWM (Pulse Width Modulation) signal, and turns ON/OFF the FETs in the H bridge circuit 22a12 in accordance with the produced PWM signal.

The lower broken-line wave shown in the FIG. 4 indicates the desired output voltage (in waveform). It should be noted that the period T (step) of the PWM signal (PWM waveform) is actually much shorter than shown, but is enlarged in FIG. 4 for ease of understanding.

Again returning to the explanation of FIG. 1, the inverter section 22 is connected to the filter section 24.

The filter section 24 comprises LC filters (low pass filters) 24a1, 24b1, 24c1 that remove a higher harmonic wave and noise filters 24a2, 24b2, 24c2 that remove a noise. The AC output inverted in the inverter section 24 is inputted to the LC filters 24a1, 24b1, 24c1 and noise filters 24a2, 24b2, 24c2 to remove a higher harmonic wave and noise.

Figure 5:
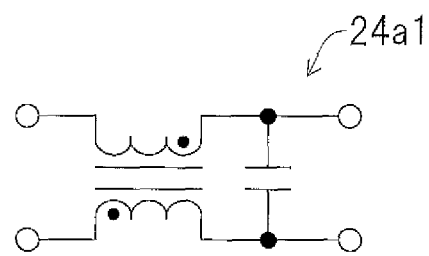
FIG. 5 is a circuit diagram showing a detailed configuration of a filter section of the inverter generator shown in FIG. 1.
Figure 6:
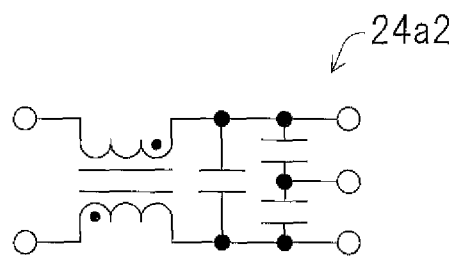
FIG. 6 is a circuit diagram similar to FIG. 5, but showing another detailed configuration of the filter section of the inverter generator shown in FIG. 1.

FIG. 5 shows a circuit configuration of the LC filter 24a1, and FIG. 6 shows a circuit configuration of the noise filter 24a2. Although not shown, circuit configurations of the LC filters 24b1, 24c1 and noise filters 24b2, 24c2 are the same.

In FIG. 1, the inverter section 22 is connected to the output section 26 via the filter section 24.

As shown in the figure, the output section 26 comprises a three-phase (four-wire) output terminal 26e and a single-phase (two-wire) output terminal 26f. The three-phase output terminal 26e is connected to terminal groups 26a, 26b, 26c which are in turn connected to the first, second and third inverters 22a, 22b, 22c respectively and output one AC in a phase from among U, V, W-phases respectively, and is connected to a neutral terminal (neutral point) 26d of the terminal groups in series. The single-phase output terminal 26f is connected to the terminal groups in parallel and to the neutral terminal 26d in series.

To be more specific, the three-phase (four-wire) output terminal 26e is series-connected to a U-phase terminal 26a which is connected to the first inverter 22a and outputs a U-phase AC, to a V-phase terminal 26b which is connected to the second inverter 22b and outputs a V-phase AC, to a W-phase terminal 26c which is connected to the third inverter 22c and outputs a W-phase AC, and to the neutral O-phase terminal 26d respectively.

Further, the output section 26 has the single-phase (two-wire) output terminal 26f which is parallel-connected to the U-phase terminal 26a, to the V-phase terminal 26b and to the W-phase terminal 26c, and is series-connected to the O-phase terminal 26d, and has a switching mechanism 26g that switches the three-phase output terminal 26e and the single-phase output terminal 26f.

The three-phase output terminal 26e and single-phase output terminal 26f are connected to an electric load 32 via a connector (not shown) and the like.

The engine control section 28 has a 32-bit CPU 28c and controls operation of the engine 12. The engine control section 28 is connected to the CPUs 22a2, 22b2, 22c2 (first, second and third controllers) of the inverters 22a, 22b, 22c via a CAN (Control Area Network) BUS 28a and a CAN I/F (Interface) 28b so that it can communicate with the CPUs 22a2, 22b2, 22c2. The output from the aforementioned output winding (sub winding) 20 is supplied to the CPU 22a2, 22b2, 22c2, 28c as their operating power.

The engine control section 28 has a starter-generator driver (STG DRV) 28d which operates the output winding 18c, in addition to the generator, as a starting device (starter) of the engine 12. Specifically, in this embodiment, one of the output windings 18a, 18b, 18c (e.g., output winding 18c) is configured to operate as an engine starter with the aid of the starter-generator driver 28d, in other words the alternator section 16 is configured to operate as a prime mover.

The starter-generator driver 28d comprises a DC-DC converter 28d1. As described later, the DC-DC converter 28d1 boosts the output (raises its voltage) of the battery 14 to about 200V and supplies the boosted battery output to the output winding 18c in response to a command from the CPU 28c so that the rotor 16b of the alternator section 16 is rotated relative to the stator 16a to start the engine 12.

The engine control section 28 further includes a TDC (Top Dead Center) circuit (not shown) to detect pulses outputted from a pulsar (not shown) made of a magnetic pickup installed at location close to the stator 16a or rotor 16b, and an engine speed detection circuit 28e that is connected to a U-phase terminal of the output winding 18c to detect an engine speed based on the output thereof.

The engine control section 28 further includes a communication (COM) I/F 28f, a sensor (SENSOR) I/F 28g, a display (DISP) I/F 28h, a switching (SW) I/F 28i, a drive circuit 28j that drives the throttle motor 12d, a drive circuit 28k that drives the choke motor 12e, and an ignition drive circuit 28l that drives an ignition device (not shown).

The aforementioned 32-bit CPU 28c determines an opening of the throttle valve 12b in such a manner that the engine speed converges at a desired engine speed calculated in accordance with a required AC output to be supplied to the electric load 32, and supplies current (power) to the throttle motor 12d through the drive circuit 28j to control its operation.

The control panel section 30 has a remote (REMOTE) I/F 30a which is connected wirelessly (or in wired) to a remote control box (not shown) provided separately from the engine 12 and adapted to be carried by a user, an LED (Light Emitting Diode) 30b, an LCD (Liquid Crystal Display) 30c, a KEY switch (main switch) 30d which is adapted to be manipulated by the user and to send a command to operate (start) and stop the generator 10, and a three-phase/single-phase selector switch 30e which is adapted to send a command to switch the output from the generator 10 between the three-phase AC and single-phase AC.

The control panel section 30 and the engine control section 28 are connected wirelessly (or in wired) to communicate with each other. The outputs of the KEY switch 30d and selector switch 30e of the control panel section 30 are inputted to the engine control section 28 through the switching I/F 28i, and the engine control section 28 controls to flush the LED 30b and LCD 30c of the control panel section 30 through the display I/F 28h.

Figure 7:
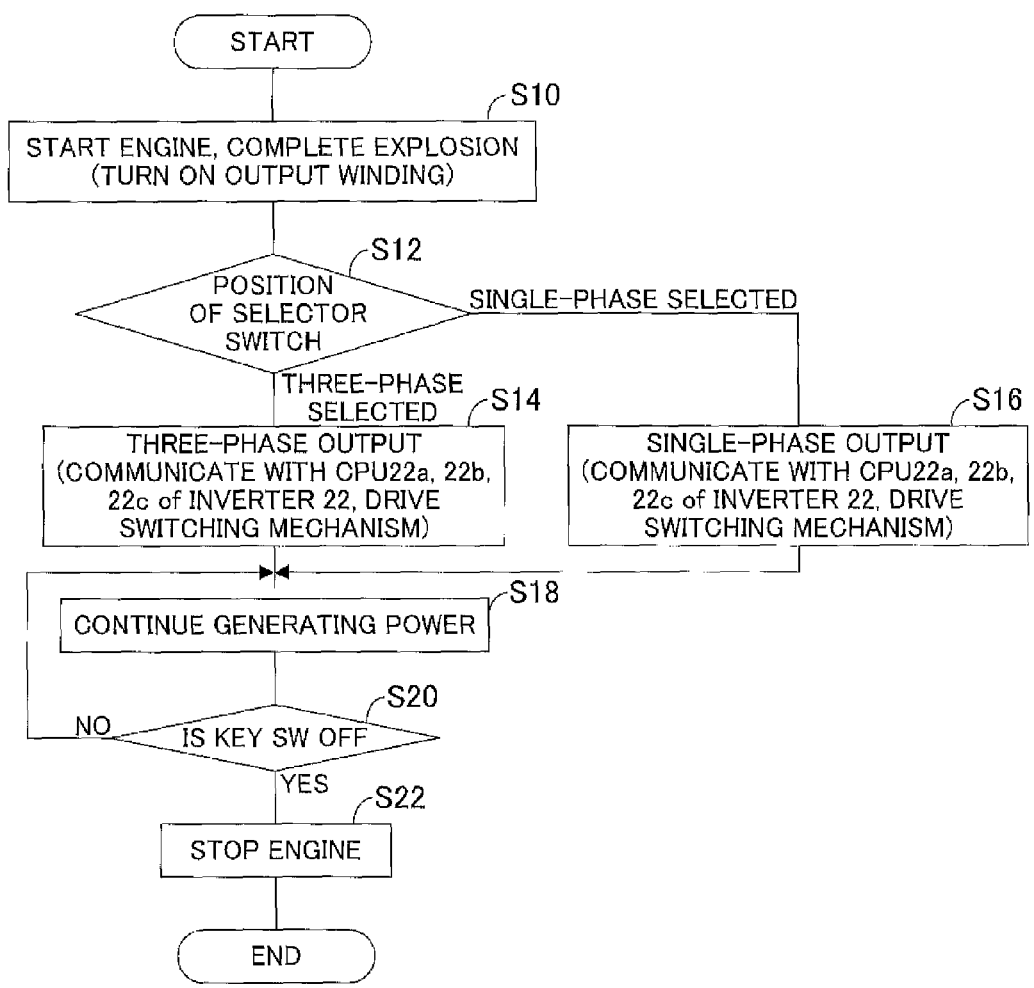
FIG. 7 is a flowchart showing an operation of an engine control section of the inverter generator shown in FIG. 1.

FIG. 7 is a flowchart explaining an operation of the engine control section 28. The illustrated program is executed when the KEY switch 30d is turned ON by the user.

The program begins at S (Step; processing step) 10, in which the engine 12 is started. Specifically, the engine control section 28 operates the DC-DC converter 28d1 of the starter-generator driver 28d to boost the output of the battery 14 and supplies the boosted battery output to the output winding 18c to start the engine 12.

Upon starting the engine 12, the program then proceeds to S12, in which the position of the selector switch 30e is discriminated. When it is discriminated that the three-phase output (three-phase AC) is selected (switched to the three-phase output), the program proceeds to S14, in which the engine control section 28 communicates with the CPUs 22a2, 22b2, 22c2 of the three single-phase inverters 22a, 22b, 22c of the inverter section 22, and operates the switching mechanism 26g of the output section 26 to output three-phase AC from the three-phase output terminal 26e (to connect to the load 32).

On the other hand, when it is discriminated that the single-phase output (single-phase AC) is selected (switched to the single-phase output), the program proceeds to S16, in which the engine control section 28 similarly communicates with the CPUs 22a2, 22b2, 22c2 of the three single-phase inverters 22a, 22b, 22c of the inverter section 22, and operates the switching mechanism 26g of the output section 26 to output single-phase AC from the single-phase output terminal 26f.

The program next proceeds to S18, in which the engine control section 28 communicates with the CPUs 22a2, 22b2, 22c2 of the three single-phase inverters 22a, 22b, 22c to output either the selected single-phase or three-phase AC, so as to continuously generate power.

The program then proceeds to S20, in which it is determined whether the KEY switch 30d is turned OFF, i.e., determined whether the engine 12 is stopped by the user. When the result in S20 is negative, the program returns to S18, while when the result in S20 is affirmative, the program proceeds to S22 to terminate the ignition to stop the engine 12 forcibly.

Figure 8:
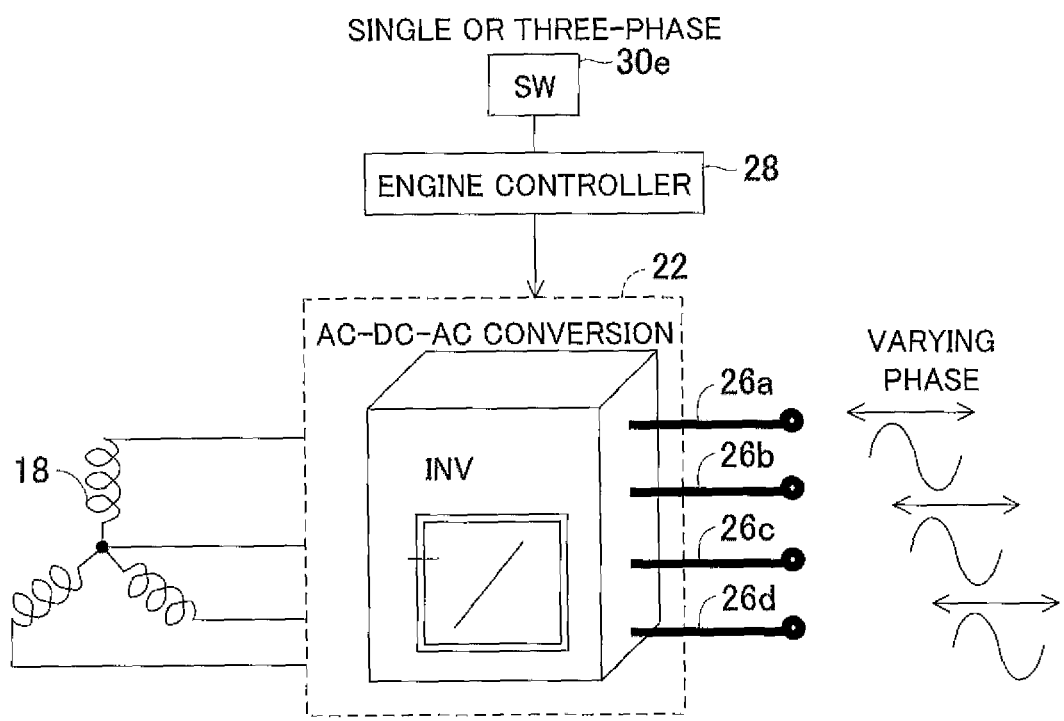
FIG. 8 is an explanatory view showing an operation of the engine control section of the inverter generator shown in FIG. 1.

FIG. 8 is an explanatory view showing the operation of FIG. 7.

As described above, since the generator 10 of this embodiment is intended to selectively and reliably output the three-phase AC and single-phase AC at a desired voltage in a desired phase, the inverter section 22 is configured to have three sets of the single-phase inverters (first, second and third inverters) 22a, 22b, 22c, and the CPU 28c of the engine control section 28 is configured to operate the switching mechanism 26g of the output section 26 to switch the three-phase output terminal and the single-phase output terminal in response to the output of the selector switch 30e.

In the inverter section 22, one of the single-phase inverters 22a, 22b, 22c, e.g., the inverter 22a, is designated as a master inverter and the others as slave inverters. When the three-phase AC is to be outputted from the generator 10 along with the communication with the CPU 28c of the engine control section 28, as shown in FIG. 8, the CPUs 22a2, 22b2, 22c2 of the three sets of the single-phase inverters 22a, 22b, 22c control the operation of the inverter section 22, making the output phase from the U-phase output terminal 26a of the master inverter 22a as a reference, such that the output phases from the V-phase output terminal 26b and W-phase output terminal 26c of the slave inverters 22b, 22c are offset or delayed from that from the U-phase output terminal 26a by 120 degrees.

On the other hand, when the single-phase AC is outputted along with the communication with the CPU 28c, the CPUs 22a2, 22b2, 22c2 control the operation of the inverter section 22 to synchronize the outputs from the V-phase output terminal 26b and W-phase output terminal 26c of the slave inverters 22b, 22c in phase, making the output from the U-phase terminal 26a of the master inverter 22a as the reference, such that the single-phase AC is outputted from the single-phase output terminal 26f.

Figure 9:
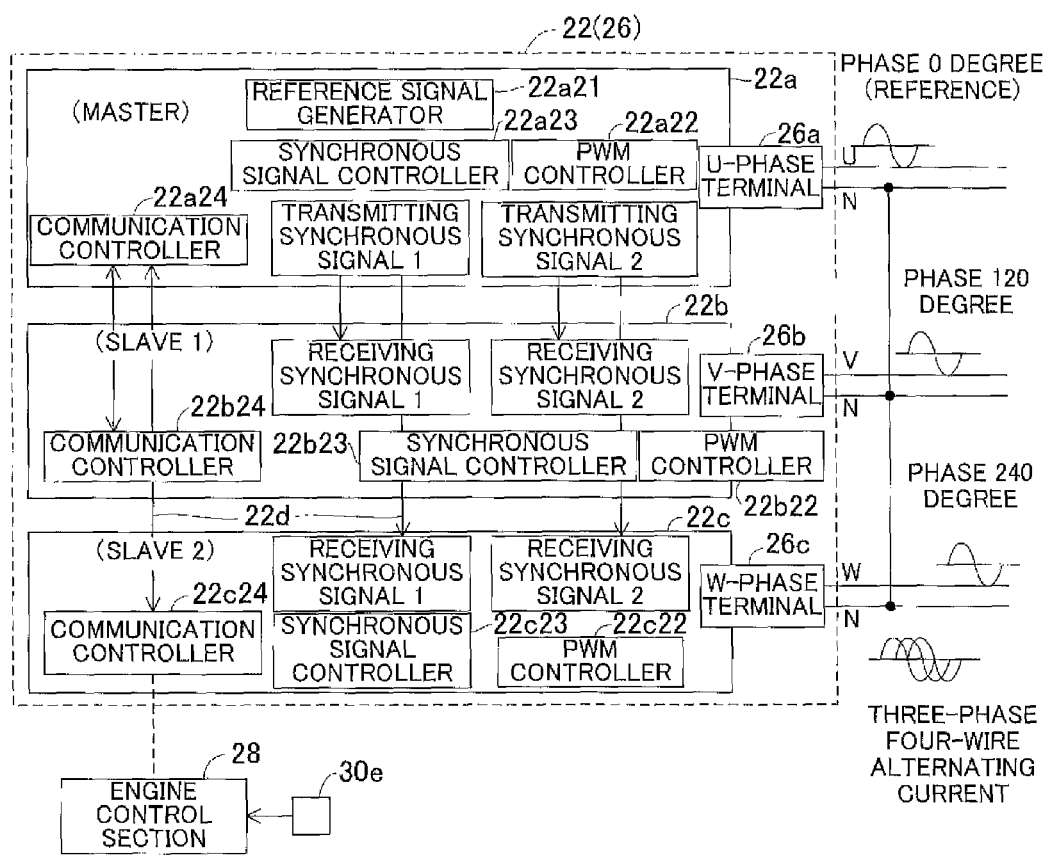
FIG. 9 is a block diagram specifically showing an operation of a controller of the inverter section of the inverter generator shown in FIG. 1.
Figure 10A:
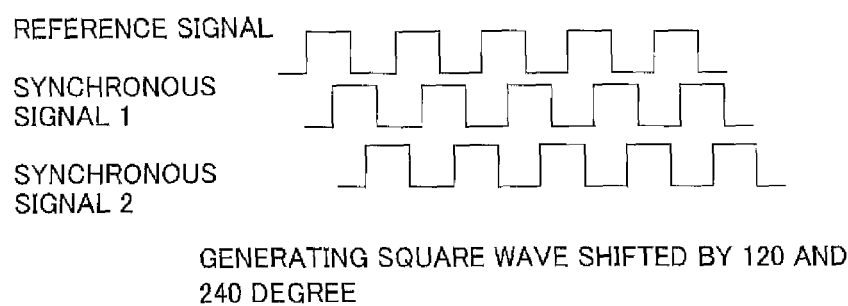
FIGS. 10A-10B are time charts explaining a reference signal and synchronous signals used in the configuration shown in FIG. 9.
Figure 10B:
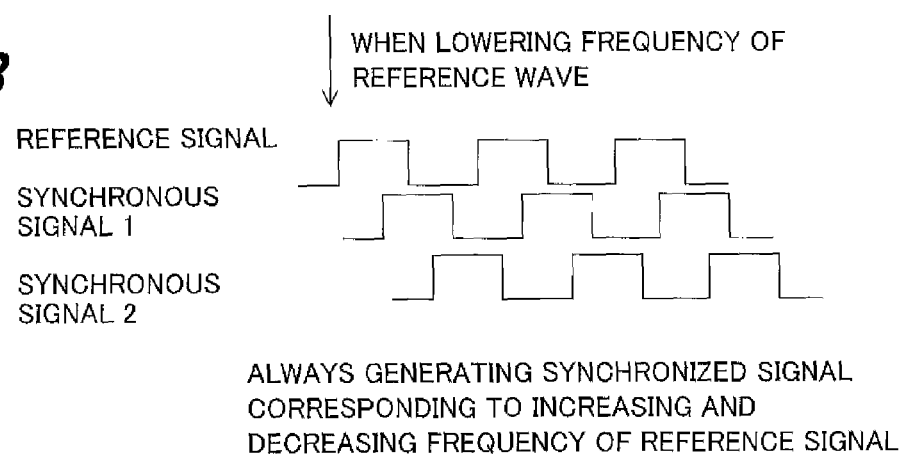

FIG. 9 is a block diagram showing an operation of the CPUs 22a2, 22b2, 22c2, specifically, an operation of an autonomous running control of the generator, and FIGS. 10A-10B are time charts explaining a reference signal and synchronous signals used in the operation of FIG. 9.

As illustrated, the CPU 22a2 of the first (master) inverter 22a has a reference signal generator 22a21 which generates the reference signal (shown in FIGS.10A-10B) of the predetermined frequency, a PWM controller 22a22 which conducts a PWM control in response to the PWM signals described in FIG. 4, a synchronous signal controller 22a23 which generates synchronous signals 1, 2 (having a predetermined phase difference from the reference signal; shown in FIGS. 10A-10B) that are used to synchronize the output phases of the slave inverters 22b, 22c with the output phase of the master inverter 22a and transmits them to the CPU 22b2, 22c2, and a communication controller 22a24 which controls transmitting and receiving (communication of) the generated synchronous signals through the communication path 22d.

The second and third slave inverters 22b, 22c also have, except for the reference signal generator, PWM controllers 22b22, 22c22, synchronous signal controllers 22b23, 22c23 and communication controllers 22b24, 22c24 which are basically same as those of the master inverter 22a.

The CPU 22a2 of the first (master) inverter 22a, more specifically its synchronous signal controller 22a23 generates the synchronous signals 1, 2 offset by 120 degrees from the reference signal (in other words, the signals that have predetermined phase differences from the reference signal) and transmits them to the CPUs 22b2, 22c2, if the command to output (switch to) the three-phase AC is sent through the selector switch 30e. This will be same when the frequency of the reference signal is a predetermined frequency (FIG. 10A) or lower than the predetermined frequency (FIG. 10B).

Further, the CPU 22a2 of the first (master) inverter 22a communicates with the CPU 22b2, 22c2 and controls the operation of the inverter section 22 to synchronize the V-phase and W-phase outputs from the output terminals 26b, 26c with the output phase of the U-phase output terminal 26a, when the single-phase AC is to be outputted along with the communication with the CPU 28c, such that the single-phase AC is outputted from the single-phase output terminal 26f.

Specifically, the CPU 22a2 generates the reference signal of the predetermined frequency and the synchronous signals that have a predetermined phase difference (i.e., the same phase) from the reference signal, sends them to the CPUs 22b2, 22c2, and controls the operation of the inverter section 22 to synchronize the V-phase and W-phase outputs from the output terminals 26b, 26c with the output phase (reference) of the U-phase output terminal 26a, such that the single-phase AC is outputted from the single-phase output terminal 26f.

Figure 11:
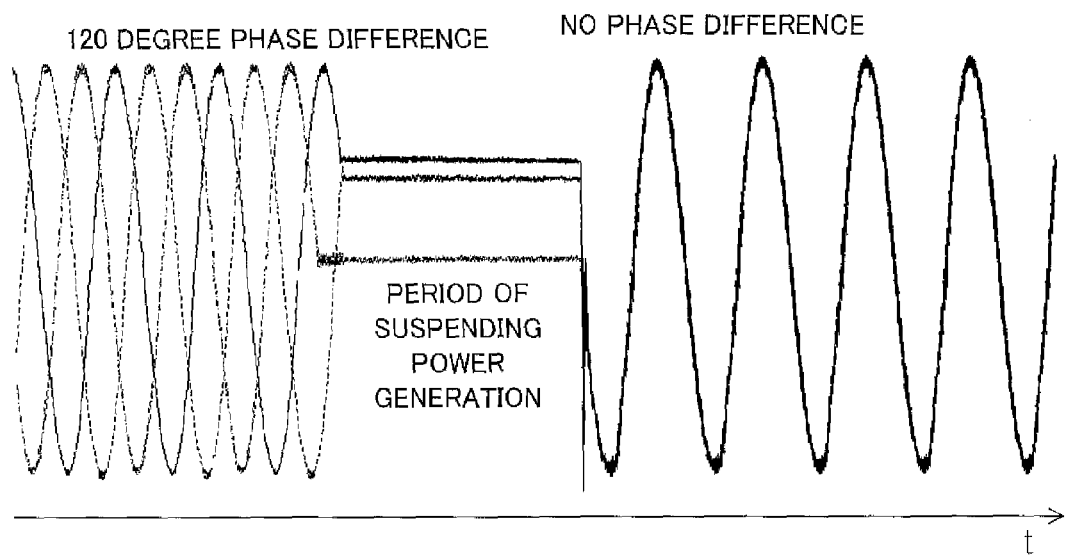
FIG. 11 is a time chart showing waveforms when an output is switched from a three-phase output to a single-phase output in response to the operation shown in FIG. 7 flowchart.
Figure 12:
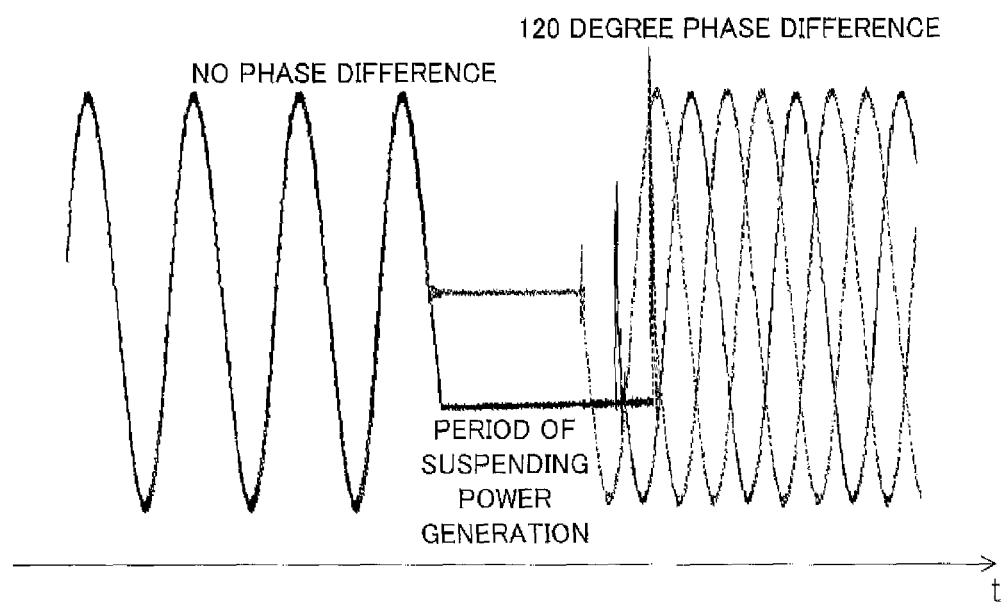
FIG. 12 is a time chart showing waveforms when an output is switched from a single-phase output to a three-phase output in response to the operation shown in FIG. 7 flowchart.

FIG. 11 is a time chart showing waveforms in a case where the output is switched from the three-phase output to the single-phase output, and FIG. 12 is a time chart showing waveforms in the opposite case. As shown, the three-phase output and single-phase output of the desired voltage are selectively outputted from the generator 10 in response to the manipulation of the selector switch 30e of the control panel section 30 by the user.

As mentioned in the foregoing, the first embodiment is configured to have an inverter generator (10) adapted to generate AC output from first, second and third windings (output windings 18a, 18b, 18c) wound around an alternator (alternator section) (16) driven by an engine (12), comprising, first, second and third inverters (22a, 22b, 22c) each connected to the first, second and third windings (18a, 18b, 18c) respectively and each having switching elements (an SCR in a hybrid bridge circuit 22a11 and an FET in an H bridge circuit 22a12) for direct current and alternating current conversion, the first, second and third inverters converting alternating current outputted from the first, second and third windings into direct current when the switching element for direct current conversion is turned ON/OFF, while inverting the converted direct current into alternating current in a desired frequency when the switching element for alternating current conversion is turned ON/OFF based on a PWM signal generated in accordance with a reference sine wave of a desired output voltage waveform and a carrier; first, second and third controllers (CPUs 22a2, 22b2, 22c2) adapted to control turning ON and OFF of the switching elements of the first, second and third inverters and connected to communicate with each other, the first controller operating the first inverter as a master inverter and the second and third controller operating the second and third inverters as slave inverters; a three-phase output terminal (26e) connected to terminal groups 26a, 26b, 26c which are connected to the first, second and third inverters (22a, 22b, 22c) to output the converted alternating current as one of U-phase, V-phase, and W-phase outputs and connected to a neutral terminal (26d) of the terminal groups in series; a single-phase output terminal (26f) connected to the terminal groups in parallel and connected to the neutral terminal in series; a switching mechanism (26g) adapted to switch the three-phase output terminal 26e and single-phase output terminal 26f; three-phase/single-phase selector switch (30e) adapted to be manipulated by a user; and an engine controller (28) adapted to control an operation of the engine (12) and operate the switching mechanism (26g) to output a three-phase alternating current or single-phase alternating current in response to an output of the selector switch (30e); wherein the first, second and third controllers (CPUS 22a2, 22b2, 22c2) control turning ON/OFF of the switching elements so that the outputs from the first, second and third inverters become three-phase alternating current or single-phase alternating current making the output from the first inverter (22a) as a reference in response to the output of the selector switch (30e) sent through the engine controller (S12-S18).

With this, it becomes possible to selectively and reliably output a three-phase and single-phase AC at a desired voltage in response to the output of the selector switch 30e adapted to be manipulated by the user, thereby enabling to utilize the output from the generator sufficiently.

Specifically, the embodiment is configured so that the first inverter 22a is designated as the master inverter and the second and third inverters as the slave inverters; and the first, second and third controllers (CPUs 22a2, 22b2, 22c2) are adapted to control turning ON and OFF of the switching elements of the first, second and third inverters 22a, 22b, 22c to output the three-phase or single-phase AC from the first, second and third inverters 22a, 22b, 22c by making the output from the first inverter 22a as the reference in response to the output of the selector switch 30e sent through the engine control section 28. With this, it easily enables to synchronize the outputs from the three inverters (generators) 22, i.e., it enables to reliably output the identical voltage in an identical phase for the single-phase output and the identical voltage in the phases offset or delayed by 120 degrees from each other. As a result, it becomes possible to surely supply three-phase and single-phase outputs of a desired voltage and in a desired phase.

Further, the embodiment is configured to connect the U-phase terminal 26a, V-phase terminal 26b and W-phase terminal 26c (which constitutes the three-phase output terminal 26e) with the single-phase output terminal 26f. With this, it becomes possible to easily output either three-phase AC or single-phase AC in response to the output of the selector switch 30e, thereby enabling to utilize the output from the generator sufficiently.

Further, in addition to the first, second and third controllers (CPU 22a2, 22b2, 22c2) which control the operation of the first, second and third inverters 22a, 22b, 22c, the embodiment is configured to separately have the engine control section 28 (more specifically, the CPU 28c) which controls the operation of the engine 12. With this, it becomes possible to control the operation of the engine 12 separately from the operation of the inverter generator 10, thereby enabling to improve convenience of the generator 10 as an engine generator.

Further, the embodiment is configured to have an engine control section 28 (more specifically, the CPU 28c) separately added from the first, second and third controllers (CPUs 22a2, 22b2, 22c2) which control the first, second and third inverters 22a, 22b, 22c. With this, it becomes possible to control the operation of the engine 12 separately from the operation of the inverter generator 10, thereby enabling to improve convenience of the generator 10 as an engine generator.

The inverter generator further includes a filter (filter section) (24) interposed at a location between the U-phase terminal (26a) and the first inverter (22a), the V-phase terminal (26b) and the second inverter (22b), and the W-phase terminal (26c) and the third inverter (22c). With this, in addition to the above effects, it becomes possible to remove a noise from the single-phase output at the filter (filter section) 24, thereby enabling to supply smoothed three-phase or single-phase output waveforms to the load 32.

Specifically, the embodiment is not configured to output the three-phase AC immediately after the inverter 22 and have a filter just before the output terminal (output section) 26 for removing the noise, but configured to have the filter (filter section) 24 between the inverter 22 and the single-phase terminal such as the U-phase terminal 26a for removing the noise. With this, it enables to supply the smoothed three-phase or single-phase output waveforms to the load 32.

In the inverter generator 10, the first, second and third controllers (CPUs 22a2, 22b2, 22c2) control the elements to output in a desired phase from the first, second and third inverters (22a, 22b, 22c) based on the output from the first inverter (22a) if the output from the first inverter is designated as the reference when outputting the three-phase alternating current. With this, in addition to the above effects, it becomes possible to output more smoothed three-phase or single-phase output waveforms and surely supply three-phase and single-phase outputs at the desired voltage in the desired phase.

In the inverter generator 10, the engine control section (28) supplies current to one of the first, second and third windings (output windings 18a, 18b, 18c) to operate the alternator section (16) as a prime mover when starting the engine (12). With this, in addition to the above effects, it becomes possible to easily start the engine 12 without having a starter-motor for starting the engine 12.

In the inverter generator 10, the alternator 16 comprises a stator (16a) mounted on a crank case (12f) of the engine (12) and a rotor (16b) rotatably installed around the stator that functions as a flywheel of the engine, and the first, second and third windings (output windings 18a, 18b, 18c) are wound around either the stator (16a) or rotor (16c) with a predetermined distance thereamong. With this, in addition to the above effects, it becomes possible to minimize the configuration of the engine generator.

Next, an inverter generator according to a second embodiment of this invention will now be explained.

The second embodiment will be explained with focus on the points of difference from the first embodiment.

In this type of inverter generators, a rated output voltage is usually set to a fixed value. However, since used power voltages are made different in different countries, e.g., AC 100V to 120V for the single-phase output and AC 200V to 240V for the three-phase output, it is often needed to modify the generator, e.g., to change specifications of the output windings in accordance with countries to which the generator 10 is to be destined. In addition, voltages for three-phase and single-phase may sometimes be made slightly different from each other in some country, i.e., the voltage between phases is set at 115V for three-phase and at 100V for single-phase.

An object of the second embodiment is therefore to overcome the above problems by providing an inverter generator that can output three-phase AC and single-phase AC of a desired voltage in a desired phase selectively and increase/decrease the selected AC output voltage easily.

Figure 13:
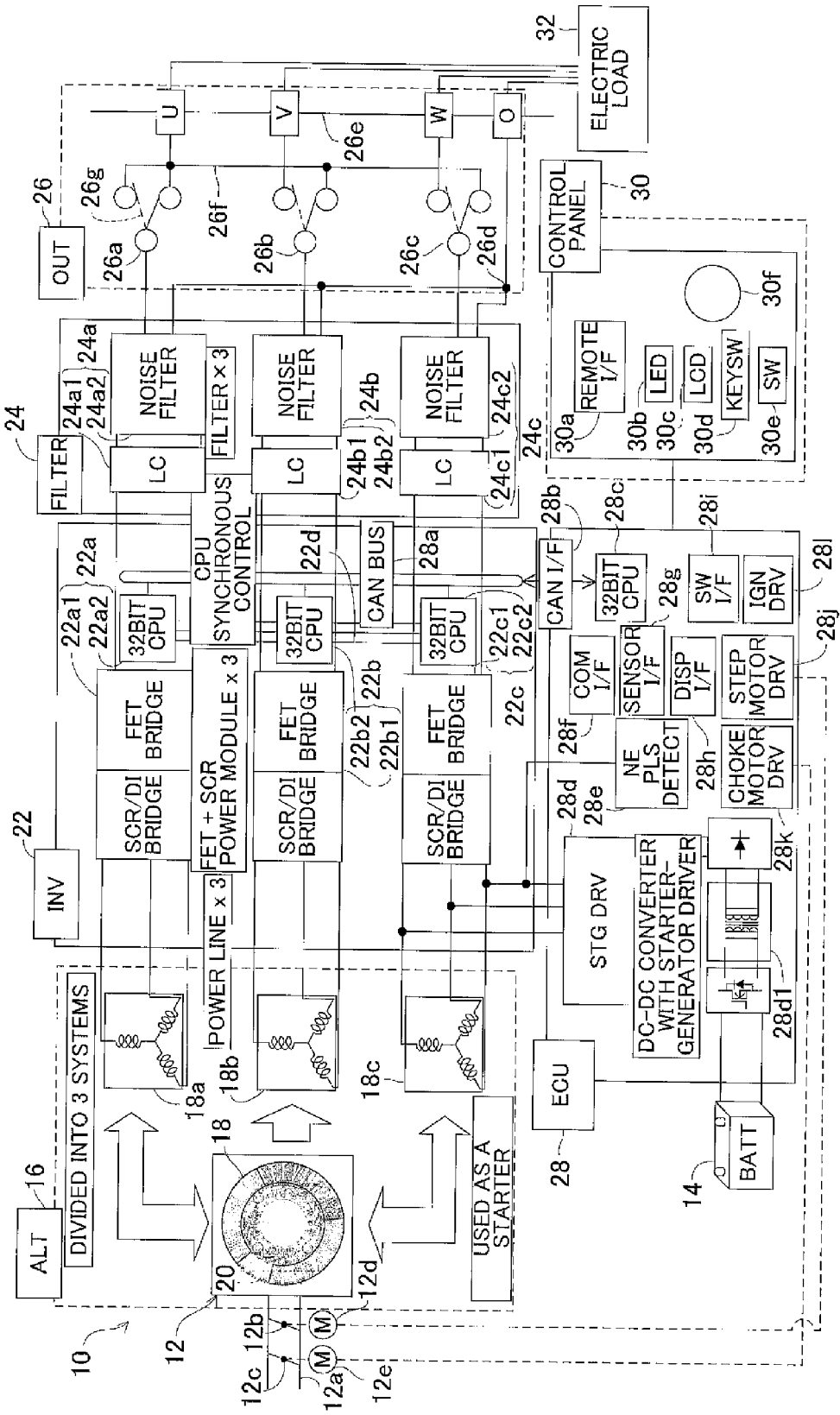
FIG. 13 is an overall block diagram showing an inverter generator according to a second embodiment of the invention.

FIG. 13 is an overall block diagram showing the inverter generator 10 according to the second embodiment of the invention.

As shown in FIG. 13, in the second embodiment, the control panel section 30 of the inverter generator 10 is provided with a switch 30f which is adapted to be manipulated by the user to indicate an output power of the generator 10 required by the user. The switch 30f can be any of an analog volume switch, a digital selector switch and other types of switches if it allows the user to select and indicate the required value.

Figure 14:
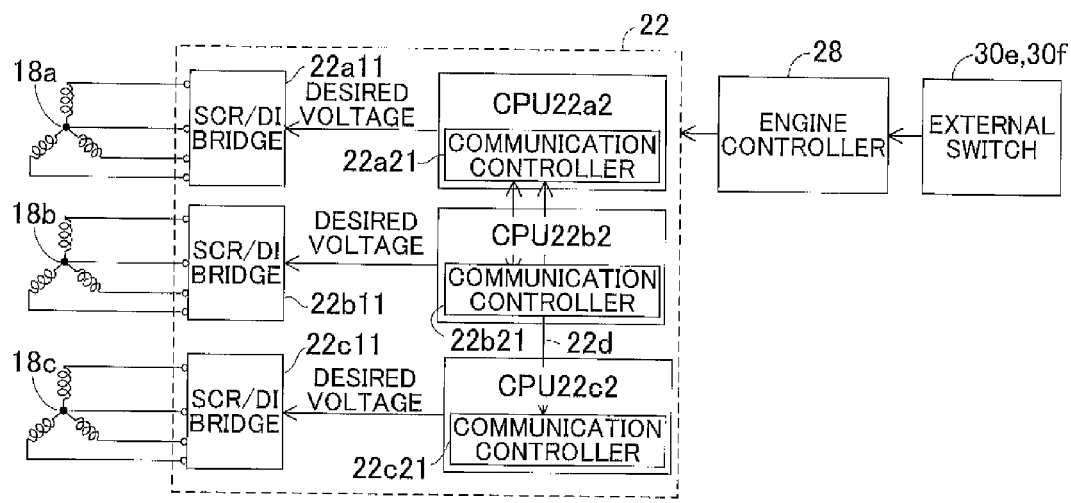
FIG. 14 is a block diagram explaining an operation of the inverter generator according to the second embodiment of the invention.

FIG. 14 is a block diagram of the inverter section 22 explaining an operation of the engine control section 28 of the inverter generator 10 according to the second embodiment of the invention.

As illustrated, in the second embodiment, similarly to the first embodiment, the CPUs 22a2, 22b2, 22c2 (first, second and third controllers) are configured to control ON and OFF of the switching elements for AC conversion (FETs in the H bridge circuits 22a12, 22b12, 22c12) to output the three-phase or single-phase AC from the first, second and third inverters 22a, 22b, 22c by making the output from the first inverter 22a as a reference in response to the output of the selector switch 30e sent through the engine control section 28 and to control turning ON and OFF of the switching elements for DC conversion (SCRs in the hybrid bridge circuits 22a11, 22b11, 22c11) to output a desired AC voltage.

Specifically, the CPUs 22a2, 22b2, 22c2 are configured to turn ON the gates of the SCRs for DC conversion in the hybrid bridge circuits 22a11, 22b11, 22c11 at a turn-on angle corresponding to the desired output voltage, and to convert the AC inputted from the output windings 18a, 18b, 18c into DC at the desired output voltage.

This will be explained. As mentioned above, since the output voltages for single-phase and three-phase are slightly made different, e.g., the voltage between phases is set at 115V (line to line voltage at 230V) for three-phase and at 100V for single-phase in some countries, the second embodiment is configured to increase/decrease the DC voltage obtained by converting the AC voltage outputted from the windings 18 such that the output voltage becomes the desired voltage indicated by the user through the switch 30f.

With this, the user can obtain a single-phase output voltage of 100V, not of 115V, i.e., the single-phase voltage identical to that available from commercial power source and can supply it to the electrical load 32.

Further, since the output voltage can be increased/decreased through a software-based technique, i.e., it is not necessary to change hardware-based specifications, e.g., windings in accordance with countries to which the generator 10 is destined.

Moreover, since the output voltage can be increased/decreased by controlling the turn-on rates (angles) of the gates of SCRs in the hybrid bridge circuits 22a11, 22b11, 22c11, in other words, it can be done without controlling the turn-on rates of FETs in the H bridge circuits 22a12, 22b12, 22c12, it becomes possible to prevent a conversion efficiency of the inverter section 22 from being degraded.

As mentioned in the foregoing, in the second embodiment, in addition to the configuration mentioned in the first embodiment, the first, second and third controllers (CPUs 22a2, 22b2, 22c2) control turning ON and OFF of the switching element (SCRs in hybrid bridge circuits 22a11, 22b11, 22c11) for direct current conversion so that outputs from the first, second and third inverters have a desired voltage. With this, it becomes possible to increase and decrease the selected AC output voltages by the software-based technique so that it does not require changing hardware-based specifications, e.g., specifications of windings, in accordance with country to which the generator 10 is destined. Further, although the output voltages for three-phase and single phase are made different, e.g., the voltage between phases is set at 115V for three-phase and at 100V for single-phase, it becomes possible to adjust the output voltages appropriately, thereby improving the convenience of the generator 10.

It should be noted that the other configuration and effects are the same as that of the inverter according to the first embodiment.

Next, an inverter generator according to a third embodiment of this invention will now be explained.

Figure 15:
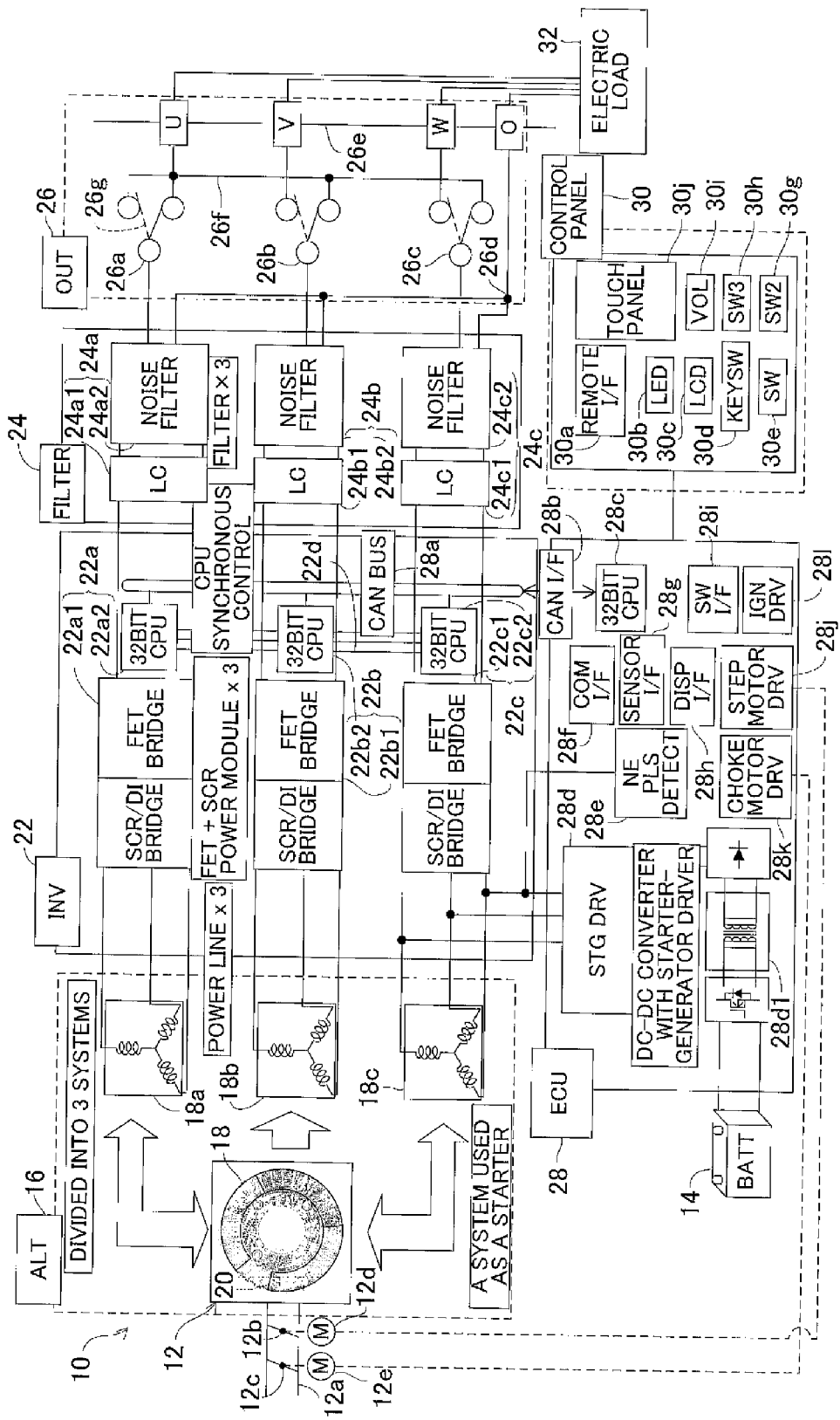
FIG. 15 is an overall block diagram showing an inverter generator according to a third embodiment of the invention.

FIG. 15 is an overall block diagram showing the inverter generator 10 according to the third embodiment of the invention.

The third embodiment will be explained with focus on the points of difference from the first and second embodiments.

The three-phase AC is useful as a power source for equipment that requires torque, e.g., pump, large fan, etc. However, in the prior art inverter generator mentioned in '904, since the frequency of the output AC voltage is fixed, it is unable to sufficiently utilize the output of the generator.

An object of the third embodiment is therefore to overcome the problem by providing an inverter generator that can output three-phase and single-phase AC at a desired voltage in a desired phase selectively and can change the frequency of the AC output as desired.

As shown in FIG. 15, in the third embodiment, the control panel section 30 of the inverter generator 10 is provided, instead of the switch 30f, with a change-over switch (SW2) 30g which indicates frequency switching between a normal (fixed) voltage/normal frequency and a variable voltage/variable frequency (VVVF), a change-over switch (SW3) 30h which indicates a switching rotation between a clockwise rotation (in the order of U, V, W) and anticlockwise rotation (in the order of U,W,V), a voltage/frequency set switch 30i which indicates the voltage and frequency to be set, and a display 30j such as a touch panel.

These switches 30g, 30h, 30i, are all adapted to be manipulated by the user, and can also be any of an analog volume switch, a digital selector switch and other types of switches if it allows the user to select and indicate the required value.

As illustrated in FIG. 15, in the third embodiment, the CPU 22a2 generates a reference signal in accordance with the frequency set by the voltage/frequency set switch 30i and synchronous signals indicating a predetermined phase difference (120 degrees) from the reference signal, and sends the synchronous signals to the CPUs 22b2, 22c2 to control the U-phase and W-phase outputs from the output terminals 26b, 26c by making the output from the U-phase terminal 26a as a reference, such that the single-phase AC or three-phase AC are outputted as desired.

Further, in response to the output of the voltage/frequency set switch 30i sent through the engine control section 28, the CPU 22a in cooperation with the CPUs 22b2, 22c2 through communication, turns ON the gates of the SCRs in the hybrid bridge circuits 22a11, 22b11, 22c11 at the turn-on angles corresponding to the desired output voltage with using a feedback control law, etc., to convert the AC voltage inputted from the output windings 18a, 18b, 18c into the desired DC output voltage, such that the three-phase AC or single-phase AC at the desired voltage is outputted Further, in the third embodiment, in order to maintain a constant output power, the (amplitude of) output voltage is adjusted in accordance with a change in the frequency. This will be explained.

Figure 16:
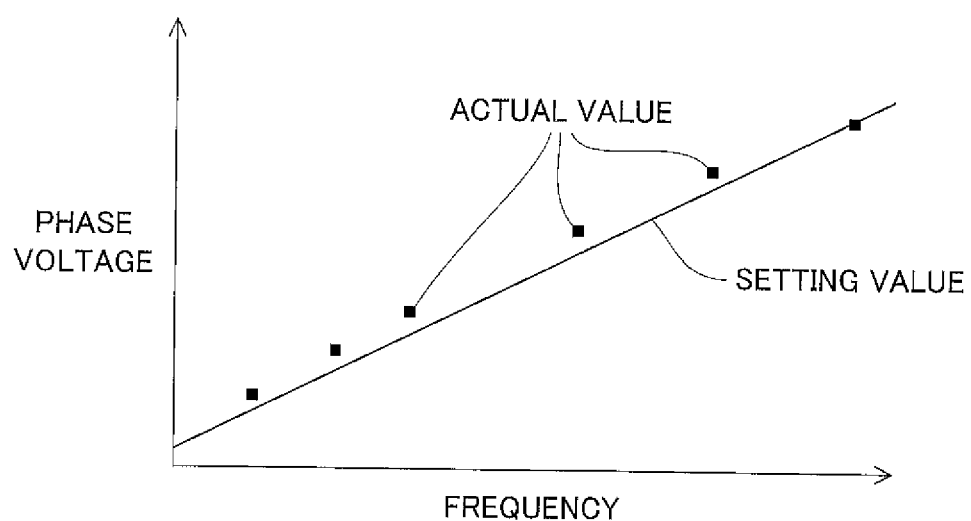
Figure 17:
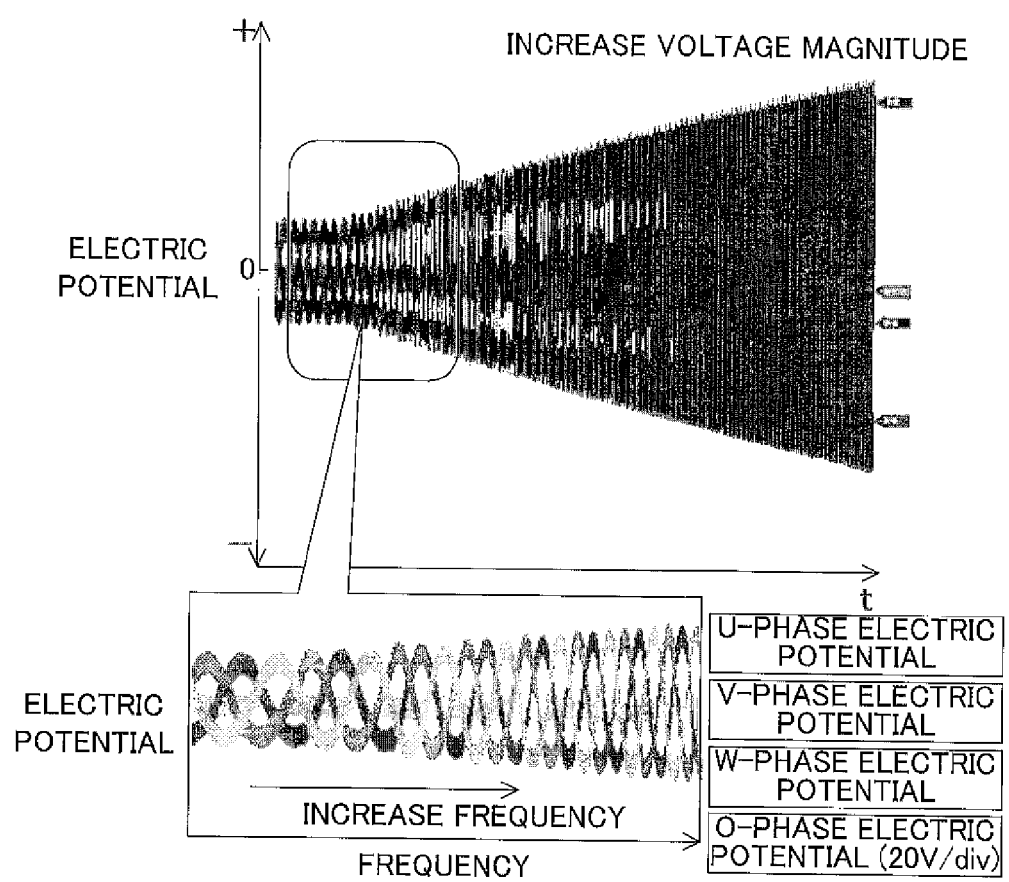
FIG. 17 is a time chart showing behavior of a frequency as increasing a voltage (amplitude) of the inverter generator shown in FIG. 15.

FIG. 16 is an explanatory view for showing characteristics of generated voltage against frequency, and FIG. 17 is a time chart showing behavior of the frequency as increasing the voltage (amplitude).

As mentioned in the second embodiment, in response to the frequency set by the voltage/frequency set switch 30i, the CPU 22a2, CPUs 22b2, 22c2 (under the command of the CPU 22a2) turn ON the gates of SCRs in the hybrid bridge circuits 22a11, 22b11, 22c11 at turn-on angles corresponding to the desired output voltage calculated based on the characteristics shown in FIG. 16 so that the AC voltage inputted from the output windings 18a, 18b, 18c is converted into the desired output DC voltage. As a result, it becomes possible to increase the frequency as the output voltage increases.

As mentioned in the foregoing, in addition to the configuration mentioned in the first embodiment, the third embodiment is configured to have an inverter generator 10 further including: a frequency set switch (30i), and the first, second and third controllers (CPUs 22a2, 22b2, 22c2) control turning ON and OFF of the switching elements so that the outputs from the first, second and third inverters (22a, 22b, 22c) become the three-phase alternating current or single-phase alternating current at the frequency set by the frequency set switch (30i) in response to the output of the selector switch 30e based on the output from the first inverter (22a) when the output from the first inverter is designated as the reference. With this, in response to the selector switch 30e adapted to be manipulated by the user, it becomes possible to output the three-phase AC and single-phase AC at the desired voltage selectively and reliably, thereby enabling to utilize the output from the generator sufficiently.

Further, since the third embodiment is configured to turn ON/OFF the switching elements to output AC voltage in the frequency set by the frequency set switch 30i adapted to be manipulated by the user, it enables to appropriately adjust the frequency as indicated (set) by the user. Consequently, when the generator 10 is used as a power source for equipment which requires torque, e.g., pump, large fan, etc., it becomes possible to increase or decrease the engine speed to reduce the consumed energy so as to utilize the output from the generator sufficiently.

Further, in the third embodiment, the first controller (CPU 22a2) generates a reference signal corresponding to the frequency set by the frequency set switch (30i) and a synchronous signal having a predetermined phase differences from the reference signal, and sends the synchronous signal to the second and third controllers (CPUs 22b2, 22c2), so that the first, second and third controllers (CPUs 22a2, 22b2, 22c2) control turning ON and OFF of the switching elements in accordance with the reference signal and synchronous signal to output the three-phase alternating current or single-phase alternating current at the frequency set by the frequency set switch from the first, second and third inverters (22a, 22b, 22c). With this, in addition to the above effects, it becomes possible to surely adjust the frequency as indicated by the user.

Further, in the third embodiment, the first, second and third controllers (CPUs 22a2, 22b2, 22c2) control turning ON and OFF of the switching elements so that the outputs from the first, second and third inverters (22a, 22b, 22c) have a voltage obtained by retrieving a characteristic based on the frequency set by the frequency set switch (30i). With this, in addition to the above effects, it becomes possible to further improve the convenience when the generator 10 is used as a power source for equipment that requires torque.

It should be noted that the other configuration and effects are the same as that of the inverter according to the first and second embodiments. As stated above, the first, second and third embodiments of the invention are configured to have an inverter generator 10 adapted to generate AC output from first, second and third windings (18a, 18b, 18c) wound around an alternator (alternator section) (16) driven by an engine (12), comprising first, second and third inverters (22a, 22b, 22c) each connected to the first, second and third windings (output windings 18a, 18b, 18c) respectively and each having switching elements (an SCR in a hybrid bridge circuit 22a11 and an FET in an H bridge circuit 22a12) for direct current and alternating current conversion, the first, second and third inverters converting alternating current outputted from the first, second and third windings into direct current when the switching element for direct current conversion is turned ON/OFF, while inverting the converted direct current into alternating current in a desired frequency when the switching element for alternating current conversion is turned ON/OFF based on a PWM signal generated in accordance with a reference sine wave of a desired output voltage waveform and a carrier; first, second and third controllers (CPUs 22a2, 22b2, 22c2) adapted to control turning ON and OFF of the switching elements of the first, second and third inverters and connected to communicate with each other, the first controller operating the first inverter as a master inverter and the second and third controller operating the second and third inverters as slave inverters; a three-phase output terminal (26e) connected to terminal groups (26a, 26b, 26c) which are connected to the first, second and third inverters (22a, 22b, 22c) to output the converted alternating current as one of U-phase, V-phase, and W-phase outputs and connected to a neutral terminal (26d) of the terminal groups in series; a single-phase output terminal (26f) connected to the terminal groups in parallel and connected to the neutral terminal in series; a switching mechanism (26g) adapted to switch the three-phase output terminal 26e and single-phase output terminal (26f); three-phase/single-phase selector switch (30e) manipulated by a user; and an engine controller (engine control section 28) adapted to control an operation of the engine (12) and operate the switching mechanism (26g) to output a three-phase alternating current or single-phase alternating current in response to an output of the selector switch (30e); wherein the first, second and third controllers (CPUs 22a2, 22b2, 22c2) control turning ON/OFF of the switching elements so that the output from the first, second and third inverters becomes three-phase alternating current or single-phase alternating current making the output from the first inverter 22a as a reference in response to the output of the selector switch (30e) sent through the engine controller (S12-S18).

Specifically, the embodiments are configured so that the first inverter 22a is designated as the master inverter and the second and third inverters as the slave inverters; and the first, second and third controllers (CPUs 22a2, 22b2, 22c2) are adapted to control turning ON and OFF of the switching elements of the first, second and third inverters 22a, 22b, 22c to output the three-phase or single-phase AC from the first, second and third inverters 22a, 22b, 22c making the output from the first inverter 22a as the reference in response to the output of the selector switch 30e sent through the engine control section 28.

Further, the embodiments are configured to connect the U-phase terminal 26a, V-phase terminal 26b and W-phase terminal 26c (which constitutes of the three-phase output terminal 26e) with the single-phase output terminal 26f.

Further, in addition to the first, second and third controllers (CPU 22a2, 22b2, 22c2) which control the operation of the first, second and third inverters 22a, 22b, 22c, the embodiments are configured to separately have the engine control section 28 (more specifically, the CPU 28c) which controls the operation of the engine 12.

Further, the embodiments are configured to have an engine control section 28 (more specifically, the CPU 28c) separately added to the first, second and third controllers (CPUs 22a2, 22b2, 22c2) which control the first, second and third inverters 22a, 22b, 22c.

Further, the first, second and third embodiments are configured to include a filter (filter section 24) interposed at a location between the U-phase terminal (26a) and the first inverter (22a), the V-phase terminal (26b) and the second inverter (22b), and the W-phase terminal (26c) and the third inverter (22c).

Specifically, the embodiments are not configured to output the three-phase AC immediately after the inverter 22 and have the filter just before the output terminal (output section) 26 for removing the noise, but configured to have the filter (filter section) 24 between the inverter 22 and the single-phase terminal such as the U-phase terminal 26a for removing the noise.

Further, in the first, second and third embodiments of the invention, the first, second and third controllers (CPUs 22a2, 22b2, 22c2) control the switching elements to output in a desired phase from the first, second and third inverters 22a, 22b, 22c based on the output from the first inverter 22a if the output from the first inverter is designated as the reference when outputting the three-phase alternating current.

Further, in the first, second and third embodiments of the invention, the engine control 28 supplies current to one of the first, second and third windings (output windings 18a, 18b, 18c) to operate the alternator section 16 as a prime mover when starting the engine 12.

Further, in the first, second and third embodiments of the invention, the alternator (16) comprises a stator (16a) mounted on a crank case (12f) of the engine (12) and a rotor (16b) rotatably installed around the stator that functions as a flywheel of the engine, and the first, second and third windings (output windings 18a, 18b, 18c) are wound around either the stator (16a) or rotor (16c) with a predetermined distance thereamong.

Further, in the inverter generator 10 according to the second embodiment of the invention, the first, second and third controllers (CPUs 22a2, 22b2, 22c2) control turning ON/OFF of the switching element (SCRs in hybrid bridge circuits 22a11, 22b11, 22c11) for direct current conversion so that outputs from the first, second and third inverters have a desired voltage.

Further, in the third embodiment of the invention, it is configured to further include a frequency set switch (30i), and the first, second and third controllers (CPUs 22a2, 22b2, 22c2) control turning ON and OFF of the switching elements so that the outputs from the first, second and third inverters (22a, 22b, 22c) become the three-phase alternating current or single-phase alternating current at the frequency set by the frequency set switch (30i) in response to the output of the selector switch (30e) based on the output from the first inverter (22a) when the output from the first inverter is designated as the reference.

Further, the embodiment is configured to control turning ON/OFF the switching elements to output AC voltage in the frequency set by the frequency set switch 30i adapted to be manipulated by the user.

Further, in the third embodiment of the invention, the first controller (CPU 22a2) generates a reference signal corresponding to the frequency set by the frequency set switch (30i) and a synchronous signal having a predetermined phase differences from the reference signal, and sends the synchronous signal to the second and third controllers (CPUs 22b2, 22c2), so that the first, second and third controllers (CPUs 22a2, 22b2, 22c2) control ON and OFF of the switching elements in accordance with the reference signal and synchronous signal to output the three-phase alternating current or single-phase alternating current at the frequency set by the frequency set switch from the first, second and third inverters (22a, 22b, 22c).

Further, in the third embodiment of the invention, the first, second and third controllers (CPUs 22a2, 22b2, 22c2) control turning ON/OFF of the switching elements so that the outputs from the first, second and third inverters (22a, 22b, 22c) have a voltage obtained by retrieving a characteristic based on the frequency set by the frequency set switch 30i.

It should be noted that, although the FETs are used as the switching elements of the inverter section 22, the embodiments can use any other switching elements such as IGBTs (Insulated Gate Bipolar Transistors), and etc.

Japanese Patent Application Nos. 2011-110572, 2011-110573 and 2011-110574, all filed on May 17, 2011, are incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An inverter generator adapted to generate AC output from first, second and third windings wound around an alternator driven by an engine, comprising:

first, second and third inverters each connected to the first, second and third windings respectively and each having switching elements for direct current and alternating current conversion, the first, second and third inverters converting alternating current outputted from the first, second and third windings into direct current when the switching element for direct current conversion is turned ON/OFF, while inverting the converted direct current into alternating current in a desired frequency when the switching element for alternating current conversion is turned ON/OFF based on a PWM signal generated in accordance with a reference sine wave of a desired output voltage waveform and a carrier;

first, second and third controllers adapted to control turning ON/OFF of the switching elements of the first, second and third inverters and connected to communicate with each other, the first controller operating the first inverter as a master inverter and the second and third controller operating the second and third inverters as slave inverters;

a three-phase output terminal connected to terminal groups which are connected to the first, second and third inverters to output the inverted alternating current as one of U-phase, V-phase, and W-phase outputs and connected to a neutral terminal of the terminal groups in series;

a single-phase output terminal connected to the terminal groups in parallel and connected to the neutral terminal in series;

a switching mechanism adapted to switch the three-phase output terminal and single-phase output terminal;

three-phase/single-phase selector switch adapted to be manipulated by a user; and an engine controller adapted to control an operation of the engine and operate the switching mechanism to output a three-phase alternating current or single-phase alternating current in response to an output of the selector switch, wherein the first, second and third controllers control turning ON/OFF of the switching elements so that the outputs from the first, second and third inverters become three-phase alternating current or single-phase alternating current making the output from the first inverter as a reference in response to the output of the selector switch sent through the engine controller.

2. The inverter generator according to claim 1, further including:
a filter interposed at a location between a U-phase terminal and the first inverter, a V-phase terminal and the second inverter, and a W-phase terminal and the third inverter.

3. The inverter generator according to claim 1, wherein the first, second and third controllers control the switching elements to output in a desired phase from the first, second and third inverters based on the output from the first inverter if the output from the first inverter is designated as the reference when outputting the three-phase alternating current.

4. The inverter generator according to claim 1, wherein the engine controller supplies current to one of the first, second and third windings to operate the alternator as a prime mover when starting the engine.

5. The inverter generator according to claim 1, wherein the alternator comprises a stator mounted on a crank case of the engine and a rotor rotatably installed around the stator that functions as a flywheel of the engine, and
the first, second and third windings are wound around either the stator or rotor with a predetermined distance thereamong.

6. The inverter generator according to claim 1, wherein the first, second and third controllers control turning ON/OFF of the switching element for direct current conversion so that outputs from the first, second and third inverters has a desired voltage.

7. The inverter generator according to claim 6, further including:
a filter interposed at a location between a U-phase terminal and the first inverter, a V-phase terminal and the second inverter, and a W-phase terminal and the third inverter.

8. The inverter generator according to claim 6, wherein the first, second and third controllers control the switching elements to output in a desired phase from the first, second and third inverters based on the output from the first inverter if the output from the first inverter is designated as the reference when outputting the three-phase alternating current.

9. The inverter generator according to claim 6, wherein the engine controller supplies current to one of the first, second and third windings to operate the alternator as a prime mover when starting the engine.

10. The inverter generator according to claim 1, further including:
a frequency set switch,
and the first, second and third controllers control turning ON/OFF of the switching elements so that the outputs from the first, second and third inverters become the three-phase alternating current or single-phase alternating current at the frequency set by the frequency set switch in response to the output of the selector switch based on the output from the first inverter when the output from the first inverter is designated as the reference.

11. The inverter generator according to claim 6, further including:
a frequency set switch,
and the first, second and third controllers control turning ON/OFF of the switching elements so that the outputs from the first, second and third inverters become the three-phase alternating current or single-phase alternating current at the frequency set by the frequency set switch in response to the output of the selector switch based on the output from the first inverter when the output from the first inverter is designated as the reference.

12. The inverter generator according to claim 10, wherein the first controller generates a reference signal corresponding to the frequency set by the frequency set switch and a synchronous signal having a predetermined phase differences from the reference signal, and sends the synchronous signal to the second and third controllers, so that the first, second and third controllers control turning ON/OFF of the switching elements in accordance with the reference signal and synchronous signal to output the three-phase alternating current or single-phase alternating current at the frequency set by the frequency set switch from the first, second and third inverters.

13. The inverter generator according to claim 11, wherein the first controller generates a reference signal corresponding to the frequency set by the frequency set switch and a synchronous signal having a predetermined phase differences from the reference signal, and sends the synchronous signal to the second and third controllers, so that the first, second and third controllers control turning ON/OFF of the switching elements in accordance with the reference signal and synchronous signal to output the three-phase alternating current or single-phase alternating current at the frequency set by the frequency set switch from the first, second and third inverters.

14. The inverter generator according to claim 10, wherein the first, second and third controllers control turning ON/OFF of the switching elements so that the outputs from the first, second and third inverters have a voltage obtained by retrieving a characteristic based on the frequency set by the frequency set switch.

15. The inverter generator according to claim 11, wherein the first, second and third controllers control turning ON/OFF of the switching elements so that the outputs from the first, second and third inverters have a voltage obtained by retrieving a characteristic based on the frequency set by the frequency set switch.

* * * * *